(12) United States Patent
Bianchi

(10) Patent No.: US 9,629,338 B2
(45) Date of Patent: Apr. 25, 2017

(54) ORAL CARE CHEW FOR ANIMALS

(71) Applicant: Emanuele Bianchi, Chicago, IL (US)

(72) Inventor: Emanuele Bianchi, Chicago, IL (US)

( * ) Notice: Subject to any disclaimer, the term of this patent is extended or adjusted under 35 U.S.C. 154(b) by 316 days.

(21) Appl. No.: 13/683,420

(22) Filed: Nov. 21, 2012

(65) Prior Publication Data

US 2014/0137809 A1    May 22, 2014

(51) Int. Cl.
*A01K 29/00* (2006.01)
*A01K 15/02* (2006.01)

(52) U.S. Cl.
CPC ................... *A01K 15/026* (2013.01)

(58) Field of Classification Search
CPC ..... A01K 15/025; A01K 15/026; A01K 15/02
USPC .............. 119/702, 707, 708, 709, 710, 711
See application file for complete search history.

(56) References Cited

U.S. PATENT DOCUMENTS

| | | | |
|---|---|---|---|
| 5,191,856 A * | 3/1993 | Gordon | 119/711 |
| 5,944,516 A * | 8/1999 | Deshaies | 433/1 |
| 6,405,681 B1 * | 6/2002 | Ward | 119/707 |
| 7,194,981 B2 * | 3/2007 | Kirch et al. | 119/710 |
| 8,573,159 B1 * | 11/2013 | Crotty et al. | 119/707 |
| 2004/0005392 A1 * | 1/2004 | Filipi et al. | 426/282 |
| 2004/0126462 A1 * | 7/2004 | Tepper et al. | 426/89 |
| 2005/0100641 A1 * | 5/2005 | Lin | 426/132 |
| 2005/0217603 A1 * | 10/2005 | Hingst | 119/710 |
| 2008/0118606 B1 * | 5/2008 | Stern | 426/92 |
| 2009/0007854 A1 * | 1/2009 | Cooper | 119/707 |
| 2013/0152871 A1 * | 6/2013 | Dewey et al. | 119/710 |
| 2013/0213316 A1 * | 8/2013 | Zhang et al. | 119/707 |

* cited by examiner

*Primary Examiner* — Trinh Nguyen

(74) *Attorney, Agent, or Firm* — D. James Nahikian

(57) ABSTRACT

An oral chew for toothed animals including at least one outer stabilizing structure and at least one inner stabilizing structure said inner stabilizing structure substantially supporting one or more mesh segments exposed through one or more openings through said outer stabilizing structure to chewing and/or grasping by an animal. The mesh supported within the interstice between the outer stabilizing structure and the inner stabilizing structure and rubbing against an animal's teeth and/or gums during chewing or grasping with oral surfaces.

2 Claims, 2 Drawing Sheets

ORAL CARE CHEW FOR ANIMALS

FIELD OF INVENTION

The present invention relates generally to oral care devices and chews for animals. More particularly, the present invention relates to an integrally formed chew which exposes and supports mesh in a way that enables filaments in the mesh to contact an animal's teeth and loosen oral debris by mechanical action.

BACKGROUND OF THE INVENTION

It is commonly observed with many toothed animals, including cats and dogs, that they chew objects they do not consume. This may be appreciated as a means by which an animal cleans its teeth and mouth by loosening and removing oral debris through the process and mechanisms of chewing. Of course, certain objects chewed may not promote, and may actually worsen, oral hygiene, for example consumer electronics, furniture and garbage.

Some pet owners, zookeepers and others interacting with animals may attempt to improve an animal's oral hygiene by enlisting veterinary services or similar whereby the teeth and/or gum line of an animal are periodically brushed, scraped, flossed, sprayed or otherwise cleaned as determined appropriate. Oral care services cost money, occupy time, cause inconvenience, and the procedures may not be well-tolerated by every animal.

There is a thus a continuing, ongoing need for an apparatus in the form of an oral care chew for animals that leverages an animal's chewing and/or oral grasping activities to help maintain the animal's oral hygiene, and minimize human intervention, by cleaning and stimulating the animal's teeth and gum line through a flossing-type action. In particular, the animal chew should stabilize one or more layers of mesh so that, as the animal's teeth move and penetrate gaps between filaments or bundles of filaments in the mesh, the teeth and other oral surfaces are brought into contact with multiple filaments, the friction created thereby loosening, and the mesh trapping, accumulated plaques, oral debris and/or other undesirable substances. Further, such chew should be configurable during manufacture to account for physical differences among various animals in terms of their respective mouth dimensions, tooth dimensions, bite forces and other physical and behavioral attributes of an animal. Preferably, such an animal chew should include components replaceable or otherwise maintainable by a human associating with an animal. It is also preferred that an oral care chew for animals contain one or more aromatics, for example meat scent or flavorings, spearmint, anise or catnip, as inducement for an animal to approach the article and chew or grasp it using the mouth.

SUMMARY OF THE INVENTION

The embodiments contemplated will include an outer stabilizing structure that contains both inner stabilizing structure and mesh in an integrated assembly that forms an apparatus.

According to one embodiment of the present invention, an apparatus for engaging the oral surfaces of an animal with mesh is provided. The apparatus includes a flexible outer stabilizing structure, it being generally understood the outer stabilizing structure may be made into almost any shape given some portion can fit into the mouth of an animal. In a preferred embodiment the shape is that of a stylized bone. The outer stabilizing structure can be manufactured of practically any materials, preferably a durable and flexible material or combination of materials, including without limitation various natural rubber, synthetic rubber, polymer and/or resin or other materials having desirable characteristics.

In a preferred embodiment, the outer stabilizing structure includes two openings placed approximately opposite from one another. Each of the openings is bifurcated by a transverse segment of the outer stabilizing structure. The openings are directed to an internal cavity within the outer stabilizing structure. An inner stabilizing structure is contained within the internal cavity. The internal cavity may take any of myriad shapes, it being generally understood the contours of the internal cavity will conform to a shape optimized to accommodate the inner stabilizing structure and mesh. The inner stabilizing structure and the outer stabilizing structure form an interstice so that one or more layers of mesh are interposed between the inner stabilizing structure and the outer stabilizing structure. The openings expose a portion of the mesh to the oral surfaces of an animal during chewing or grasping the embodiment with the mouth.

In a preferred embodiment of the present invention, the outer stabilizing structure of the apparatus is made from a unitary piece of injection-molded thermoplastic resin. In some embodiments of the present invention, the outer stabilizing structure is made from two or more pieces of suitable material that can be joined together at the time of manufacture or following commercial distribution. It can be generally appreciated that the number of pieces used to form the outer stabilizing structure of the apparatus can vary without altering the nature of the invention.

It will be generally understood that an embodiment can include any number of openings provided the outer stabilizing structure exhibits at least one opening that exposes mesh to the oral surfaces of an animal. It will be further understood by one skilled in the art that an embodiment can include any number of cavities provided the outer stabilizing structure contains at least one inner stabilizing structure and mesh.

The inner stabilizing structure of the apparatus can be made from one or more of the following materials: natural rubber, polymer such as thermoplastic resin, aggregations formed of grains such as corn, rice or wheat, and/or their husks or byproducts, or other materials having desirable characteristics. In the preferred embodiment of the present invention, the inner stabilizing structure of the apparatus is made from a unitary piece of injection-molded thermoplastic resin to form a solid elongated rod.

In some embodiments of the present invention, the inner stabilizing structure is made from two or more pieces of suitable material that can be joined together at the time of manufacture or following commercial distribution. It can be generally appreciated that the number of pieces used to form the inner stabilizing structure of the apparatus can vary without altering the nature of the invention. In some embodiments, the inner stabilizing structure is hollow. In some embodiments, the inner stabilizing structure is solid. In some embodiments, the contours of the inner stabilizing structure vary in shape and dimension.

It would be understood by one skilled in the art that the apparatus can include any number beyond one of inner stabilizing structures provided at least one inner stabilizing structure supports mesh that is exposed by at least one opening to the oral surfaces of an animal.

In preferred embodiments, the inner stabilizing structure is coated or impregnated with an aromatic. In other embodiments, the inner stabilizing structure does not contain an aromatic.

The mesh of the apparatus can be made from one or more of the following materials: nylon, aramid polymers, cotton, or other materials having desirable characteristics. In a preferred embodiment of the apparatus, the mesh is made from nylon formed to become a tube which is cut into a length that can be substantially contained within a cavity and be exposed by an opening to chewing or grasping with oral surfaces. In a preferred embodiment, the mesh can be expanded to fit over additional tubular mesh so that a plurality of mesh layers is formed concentrically as an assembly.

It will be understood by one skilled in the art that the mesh need not be tubular or acquire any particular shape and, further, that the mesh can vary in dimension and in number, provided there is at least one layer of mesh, without departing from the present invention. In preferred embodiments, the mesh is not impregnated with an aromatic. In other embodiments, the mesh does contain an aromatic.

In a preferred embodiment of the present invention, the outer stabilizing structure, inner stabilizing structure and the mesh individually or collectively contain added aromatics for inducing an animal to approach and chew. In still other embodiments, none of the outer stabilizing structure, inner stabilizing structure and mesh contains any added aromatic.

In some embodiments of the present invention, the outer stabilizing structure is shaped into a stylized animal bone pattern. In still other embodiments, the outer stabilizing structure is shaped into a stylized fish. In still other embodiments, the outer stabilizing structure is shaped into a rectangle. In still other embodiments, the outer stabilizing structure is shaped into a cylinder. In still other embodiments, the outer stabilizing structure is shaped into a spheroid. It being generally understood that any shape may be used with the objective being to further desirable characteristics such as weight, balance, stability, chewability and exposure of oral surfaces to alignment and contact with mesh.

In preferred embodiments, the invention is deployed as a stand-alone apparatus which is presented to an animal for independent chewing. In other embodiments, the invention is deployed as a stand-alone apparatus which is presented to multiple animals for collective chewing or grasping and tug-of-war. In other embodiments, the invention manifests as a plurality connected so as to enable multiple animals to engage in tug-of-war. In still other embodiments, the invention is attached to an object so that an animal can grasp the invention with the animal's oral surfaces and engage in tug-of-war against the resistance contributed by the object. In still other embodiments, the invention is attached to a handle or extension so that an animal can engage in tug-of-war with a human. It will be generally understood that any embodiment described herein will not detract from the nature of the invention.

An advantage of the present invention is that it simplifies the provision of oral care to a toothed animal.

Another advantage of the present invention is that the owner of an animal can save money to the extent the perceived need for veterinary visits is reduced.

Another advantage of the present invention is that both animal and associated human are subjected to less stress over the span of their time spent together.

Another advantage of the present invention is that it pleases or otherwise occupies a pet as evidenced by the pet chewing the invention instead of chewing on valuable objects.

Another advantage of the present invention is that it is amenable to mass manufacture and configurability.

BRIEF DESCRIPTION OF THE DRAWINGS

Various objects and advantages of this invention will become apparent from all disclosures herein including the description that follows taken in relation to the accompanying drawings wherein are set forth, by way of illustration and example, certain embodiments of this invention.

The drawings constitute a part of this disclosure, include exemplary embodiments of the present invention, and illustrate various objects and features thereof.

DESCRIPTION OF THE PREFERRED EMBODIMENTS

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for claims and as a representative basis for teaching one skilled in the art to variously employ the present invention in virtually any appropriately detailed structure.

Embodiments of the present invention include an oral care chew for animals apparatus that stabilizes and supports one or more layers of mesh exposed through one or more openings to chewing by a toothed animal so as to permit a tooth to penetrate gaps between mesh filaments and said tooth to rub against one or more filaments or bundles of filaments during chewing or grasping an embodiment with oral surfaces. The apparatus includes an outer stabilizing structure comprised of material, preferably a flexible material, a cavity within said outer stabilizing structure, an inner stabilizing structure occupying said cavity, an interstice between said outer stabilizing structure and said inner stabilizing structure, mesh interposed within the interstice formed between said outer stabilizing structure and said inner stabilizing structure, and any number of openings that expose the mesh to contact with an animal's oral surfaces. As used herein, the oral care animal chew apparatus is referred to as an apparatus for ease of reference.

Figure 1:
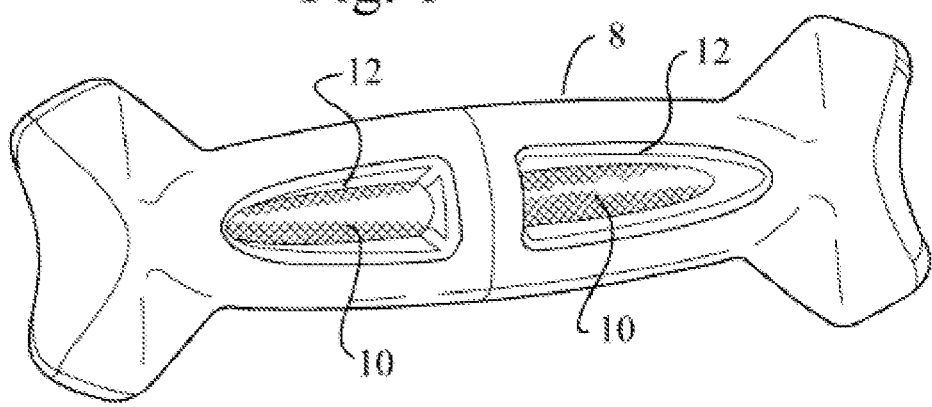
FIG. 1 is a plan view of an oral care chew for animals apparatus in accordance with one embodiment of the present invention.

Referring now to FIG. 1, a plan view of an integral apparatus in accordance with one embodiment of the present invention is shown. The outer stabilizing structure 8 contains and/or supports the other components of the invention. The outer stabilizing structure exposes the mesh 10 to the oral surfaces of an animal through an opening 12. There can be more than one opening, it being generally understood by those skilled in the art that a top opening and a bottom opening will bring an animal's top set of teeth and bottom set of teeth into contact with the mesh more or less concurrently during chewing or grasping with oral surfaces. An opening can be spanned by one or more transverse segments of the outer stabilizing structure.

Figure 2:
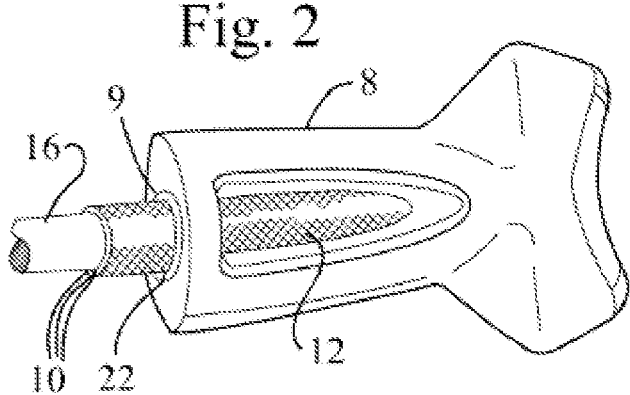
FIG. 2 is a section view of an oral care chew for animals apparatus in accordance with one embodiment of the present invention.

Referring now to FIG. 2, there is shown the outer stabilizing structure 8, the cavity 9, the mesh 10, an opening 12, the inner stabilizing structure 16, and the interstice 22 in a preferred embodiment of the apparatus. The mesh 10 substantially occupies the interstice 22 formed between the outer stabilizing structure 8 and the inner stabilizing structure 16 within the cavity 9. The inner stabilizing structure 16 confers rigidity to the mesh 10 and provides a resistance force to an animal's teeth. In one embodiment, the inner stabilizing structure 16 is a unitary solid, nonetheless, as discussed herein the inner stabilizing structure 16 need not be solid or unitary to sustain the present invention.

In addition, FIG. 2 illustrates the cavity 9 within the outer stabilizing structure 8 of preferred embodiment into which may be placed the inner stabilizing structure 16 and the mesh 10 during manufacture or by a human associated with an animal. Once assembled together, the outer stabilizing structure and the inner stabilizing structure thus create the interstice 22 which is occupied by the mesh 10. It would be generally understood that the cavity 9 need not assume any particular shape or dimension provided the cavity 9 is able to accommodate the inner stabilizing structure 16 and the mesh 10. After the inner stabilizing structure 16 and the mesh 10 have been positioned in the cavity 9 they may be secured to prevent escape from the cavity 9 by welding, gluing, blocking, plugging or by other means used in the relevant industry and suitable for chewing by animals. The means utilized for this purpose may be of a permanent or a removable nature such that in the case of the latter the inner stabilizing structure 16 and/or the mesh 10 can be withdrawn and replaced as desired. The mesh 10 and/or the inner stabilizing structure 16 may be anchored in place or they may be allowed to float or otherwise move to a desirable degree within the cavity 9.

The inner stabilizing structure 16 prevents the mesh 10 from collapsing inwards towards the center of the invention as an animal's teeth or other oral surfaces contact and apply force to said mesh 10. The inner stabilizing structure 16 may be made of any chewable material suitable for use with animals including natural rubber, synthetic rubber, polymer including thermoplastic resin, aggregations of grains including corn, rice and/or wheat, and agricultural byproducts including raw hide, bone and husks. In a preferred embodiment, the inner stabilizing structure 16 is made of a single piece of thermoplastic resin that is readily commercially available, it being generally understood that more than a single piece may be used for the inner stabilizing structure 16 and, further, that the inner stabilizing structure 16 may be solid, hollow or comprised of concentric layers without compromising the nature of the invention.

As discussed herein, an embodiment may contain more than one inner stabilizing structure 16. It is preferred that the inner stabilizing structure 16 be coated or impregnated with an aromatic, including meat scent or flavor and catnip, to induce an animal to chew or grasp the apparatus with oral surfaces.

The inner stabilizing structure 16 thus may be inserted into one or more layers of mesh 10 which in turn may be inserted into the outer stabilizing structure 8 during manufacture. In a preferred embodiment, either or both of the inner stabilizing structure 16 and the mesh 10 can be replaced periodically by a human being as these become worn by chewing and grasping.

Figure 3:
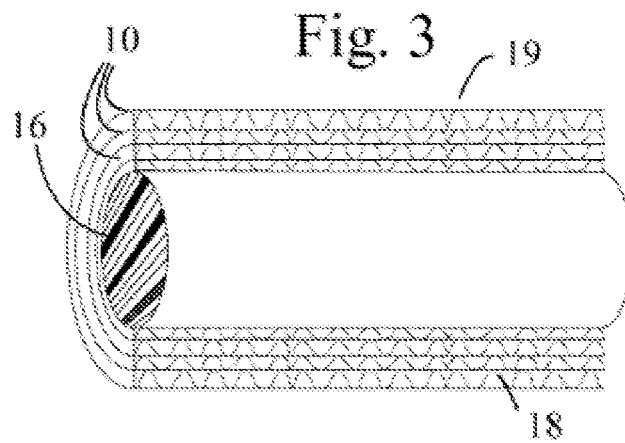
FIG. 3 is a section view that depicts the inner stabilizing structure and mesh of an oral care chew for animals apparatus in accordance with one embodiment of the present invention.

FIG. 3 is a section view of the mesh 10 and inner stabilizing structure 16 in one embodiment of the present invention. In such embodiment the inner stabilizing structure 16 is substantially surrounded by three layers of mesh 10. The mesh 10 need not surround the inner stabilizing structure 16 and may comprise one or more sections to form the present invention.

The mesh 10 is comprised of filaments 18 and/or bundles of filaments with vacant spaces 19 between said filaments and/or bundles of filaments arranged in a pattern that enables a tooth or teeth to occupy said vacant spaces and to be contacted by said filaments and/or bundles of filaments in the course of chewing or grasping with oral surfaces. The mesh 10 may made of nylon, aramid polymers, cotton, or other materials having desirable characteristics, the mesh generally needing only to be flexible so to enable a tooth to displace filaments or bundles of filaments to occupy at least one vacant space and contact the filaments and/or bundles of filaments. In a preferred embodiment the mesh 10 is made from nylon, a commercially-available material, and the mesh material comprising the mesh 10 and the filaments and bundles of filaments are manufactured in a tubular form that is amenable to ready nesting so as to form a plurality of concentric mesh layers substantially surrounding the inner stabilizing structure 16. It should be understood that the mesh 10 need not be tubular and may be placed within the outer stabilizing structure 8 as strips, slabs or other configuration having desirable characteristics without departing from the invention. It should be understood that the inner stabilizing structure 16 need not be cylindrical and can assume any shape that can be accommodated by the cavity 9.

In a preferred embodiment, the mesh 10 is layered in eight concentric tubular layers, with three such layers being depicted in FIG. 2 and FIG. 3 for the convenience of the viewer only. The number of layers of mesh 10 may be one or more as desirable for different animals and their respective physical and behavioral attributes, by way of example without limitation, only a single layer of mesh 10 may be appropriate for a small house cat while an adult tiger or mastiff may indicate ten or more layers of mesh 10. An advantage of manufacturing the invention with more than one layer of mesh 10 is that the surface area of a tooth in contact with the filaments and/or bundles of filaments is increased per bite. It would be generally understood that the mesh 10 need not completely surround the inner stabilizing structure 16 and may take different forms as desired.

Figure 4:
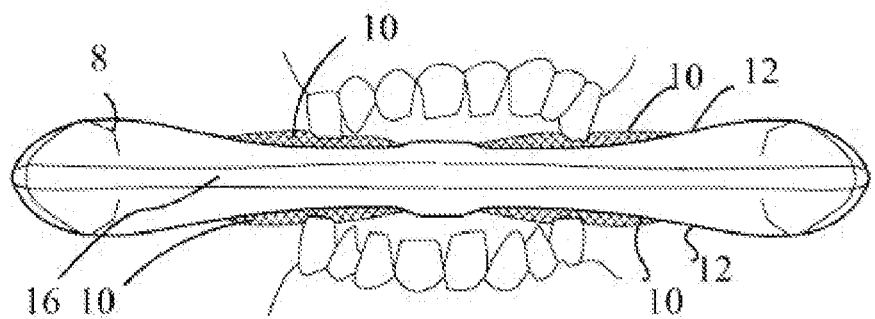
FIG. 4 is an elevation view of an oral care chew for animals apparatus in accordance with one embodiment of the present invention.

FIG. 4 is an elevation view of a preferred embodiment being grasped between the upper oral surfaces and the lower oral surfaces of a toothed animal. The inner stabilizing structure 16 is concealed by the outer stabilizing structure 8. The mesh 10 is exposed to chewing by an animal through an opening 12 located approximately opposite from a second opening 12 in the outer stabilizing structure 8 so that the animal's upper teeth and lower teeth are likely to contact mesh 10 proximate in time. An advantage of this arrangement is that an animal's teeth will experience a mechanical flossing-type action more or less symmetrically as between upper teeth and lower teeth and, thus, the mesh can be replaced or maintained efficiently in view of even wear.

Figures 5, 5A:
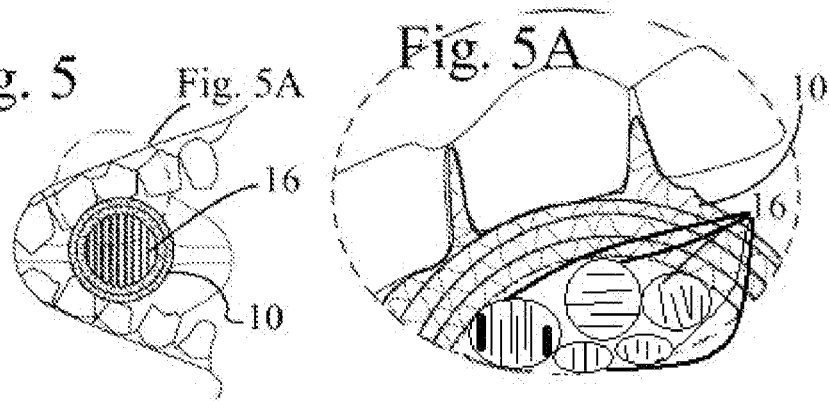
FIG. 5 is a section view that depicts the inner stabilizing structure and mesh of an oral care chew for animals apparatus in accordance with one embodiment of the present invention.
FIG. 5A is a section view that depicts the inner stabilizing structure and mesh of an oral care chew for animals apparatus in accordance with one embodiment of the present invention.

FIG. 5 is a section view of one embodiment of the apparatus and, together with related FIG. 5A, shows a tooth penetrating vacant spaces in the mesh 10 with multiple filaments contacting broad surface area of the tooth. In a preferred embodiment of the apparatus, the inner stabilizing structure 16 can rotate or be rotated, or be removed and subsequently replaced, to maintain the mesh 10 in a useful condition over time.

Figure 6:
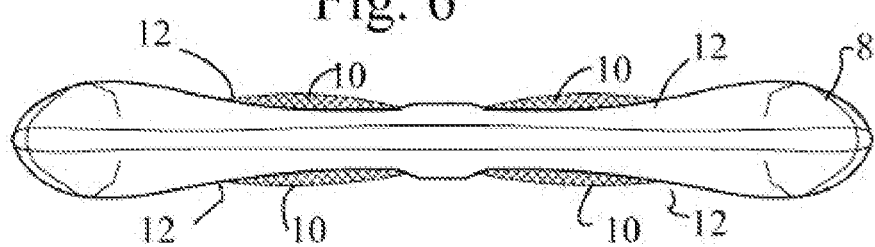
FIG. 6 is an elevation view of an oral care chew for animals apparatus in accordance with one embodiment of the present invention.

Referring now to FIG. 6, a preferred embodiment of the present invention is shown from an elevation view. The mesh 10 is exposed to chewing by an animal through an opening 12 located approximately opposite from a second opening 12 in the outer stabilizing structure 8 so that the animal's upper teeth and lower teeth are likely to contact a portion of mesh 10 at the same time. An advantage of this embodiment is that an animal's teeth will experience a flossing-type action more or less symmetrically as between upper teeth and lower teeth thereby avoiding uneven operation on the animal's oral surfaces.

An advantage of some embodiments is they may combine the apparatus into a plurality of the invention so more than one animal can chew or grasp the invention concurrently thereby generating mechanical force on their oral surfaces through tug-of-war as they oppose resistance. In one such embodiment, outer stabilizing structure 8 can have any desired number of openings 12 arranged to accommodate more than one animal. In other embodiments, a tether, leash or anchor strap is attached to the apparatus so one or more animals can engage in tug-of-war against a heavy and/or fixed object or a human being who can provide a resistance force.

From the foregoing, it will be observed that numerous variations and modifications may be effected without departing from the spirit and scope of the invention. It is to be understood that no limitation with respect to the specific apparatus herein is intended or should be inferred. It is, of course, intended to cover by the appended claims all such modifications as fall within the scope of the claims.

What is claimed is:

1. A flossing system for cleaning an animal's oral surfaces by friction during chewing comprising:
   an elastic outer stabilizing structure having at least two openings and a cavity, wherein said cavity is open to the at least two openings;
   an elastic solid elongated inner stabilizing structure contained within said cavity; and
   a plurality of mesh layers, wherein each mesh layer is formed into a tube of filament and covers at least fifty percent of the length of said elastic solid elongated inner stabilizing structure in a succeeding order such that one said mesh layer is on top of another said mesh layer and the thickness of said plurality of mesh layers is adjustable by adding, removing or replacing said each mesh layer, wherein said plurality of mesh layers occupy an interstice between said elastic solid elongated inner stabilizing structure and said elastic outer stabilizing structure.

2. The system of claim 1, wherein said each mesh layer is comprised of woven fiber with air gaps.

* * * * *